US008131385B2

(12) United States Patent
Yuzawa

(10) Patent No.: US 8,131,385 B2
(45) Date of Patent: Mar. 6, 2012

(54) POSITIONING DEVICE AND POSITIONING METHOD WITH NON-CONTACT MEASUREMENT

(75) Inventor: Takashi Yuzawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 764 days.

(21) Appl. No.: 11/814,147

(22) PCT Filed: Jan. 19, 2005

(86) PCT No.: PCT/JP2005/000572
§ 371 (c)(1),
(2), (4) Date: Jul. 17, 2007

(87) PCT Pub. No.: WO2006/077629
PCT Pub. Date: Jul. 27, 2006

(65) Prior Publication Data
US 2009/0204272 A1  Aug. 13, 2009

(51) Int. Cl.
*G06F 19/00* (2011.01)
*G05B 19/18* (2006.01)
*G01C 17/38* (2006.01)
*G05B 13/00* (2006.01)

(52) U.S. Cl. .......... 700/56; 700/162; 700/302; 700/214; 702/95; 702/1; 318/561; 318/562; 318/563

(58) Field of Classification Search .................. 700/162, 700/302, 56, 214; 702/95; 318/564, 561, 318/562, 563, 568
See application file for complete search history.

(56) References Cited

U.S. PATENT DOCUMENTS

| 4,370,721 A | * | 1/1983 | Berenberg et al. ............ 700/195 |
| 4,636,960 A | * | 1/1987 | McMurtry ..................... 700/193 |
| 4,810,946 A | | 3/1989 | Sweeney, Jr. |
| 4,953,306 A | * | 9/1990 | Weckenmann et al. ......... 33/503 |
| 5,248,867 A | * | 9/1993 | Ohba et al. ................. 219/69.15 |
| 5,285,397 A | * | 2/1994 | Heier et al. .................... 702/167 |
| 5,305,240 A | * | 4/1994 | Davis et al. ..................... 702/95 |
| 5,444,640 A | * | 8/1995 | Hirai ............................. 700/193 |

(Continued)

FOREIGN PATENT DOCUMENTS

JP   61-182511 A   8/1986

(Continued)

OTHER PUBLICATIONS

Office Action issued Jan. 25, 2011 in counterpart Japanese Patent Application No. 2006-553782.

(Continued)

*Primary Examiner* — Albert Decady
*Assistant Examiner* — Sunray Chang
(74) *Attorney, Agent, or Firm* — Sughrue Mion, PLLC

(57) ABSTRACT

A positioning device includes a driver which moves a positioning object and a sensor which measures the distance to the positioning object in a non-contacting manner and outputs a detection signal if the positioning object is detected only in a length measuring area within a predetermined range from any detection position, shaft controller which stops the driver by detecting the detection signal from the sensor and automatically correcting for an overshoot amount between the stop position and any detection position, when the driver moves the positioning object and the sensor, and the positioning controller that stores the coordinate value after the automatic correction by the shaft controller and that performs the positioning based on the reference coordinate value.

14 Claims, 11 Drawing Sheets

U.S. PATENT DOCUMENTS 5,563,797 A * 10/1996 Koyasu .................. 700/162
5,892,680 A * 4/1999 Kita et al. ................ 700/162
6,192,294 B1 * 2/2001 Chiba ..................... 700/214

FOREIGN PATENT DOCUMENTS

| JP | 63-109956 A | 5/1988 |
| JP | 8-054919 A | 2/1996 |
| JP | 2000-52198 A | 2/2000 |
| JP | 2003-205439 A | 7/2003 |
| JP | 2004-039299 A | 2/2004 |

OTHER PUBLICATIONS

Supplementary European Search Report issued Jul. 12, 2011 in counterpart European Application No. 05703809.3.

* cited by examiner (MEASUREMENT RANGE) 28~32mm (MEASUREMENT RANGE) 29.9~30.1mm (MEASUREMENT RANGE) 29.99~30.01mm

FIG. 8
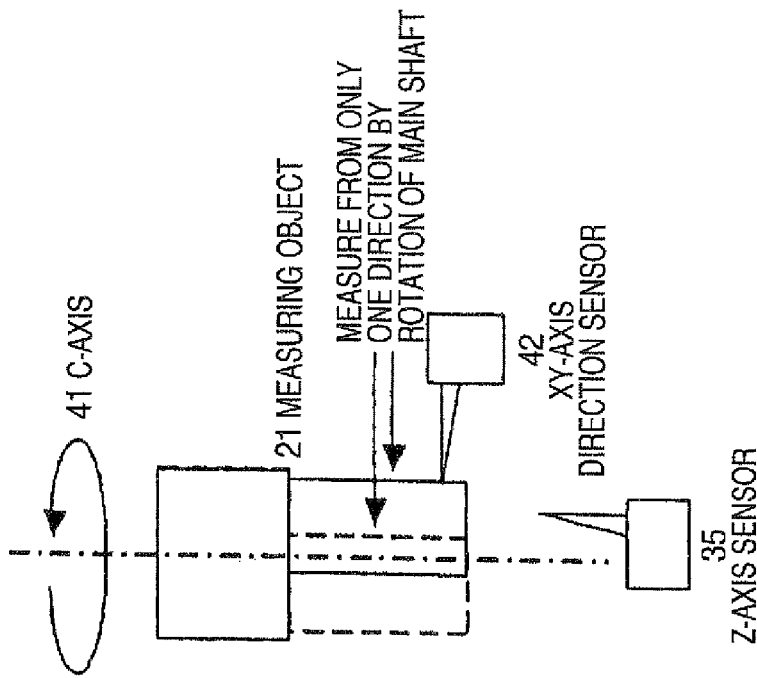
(a) FIVE-AXIS SENSOR SYSTEM
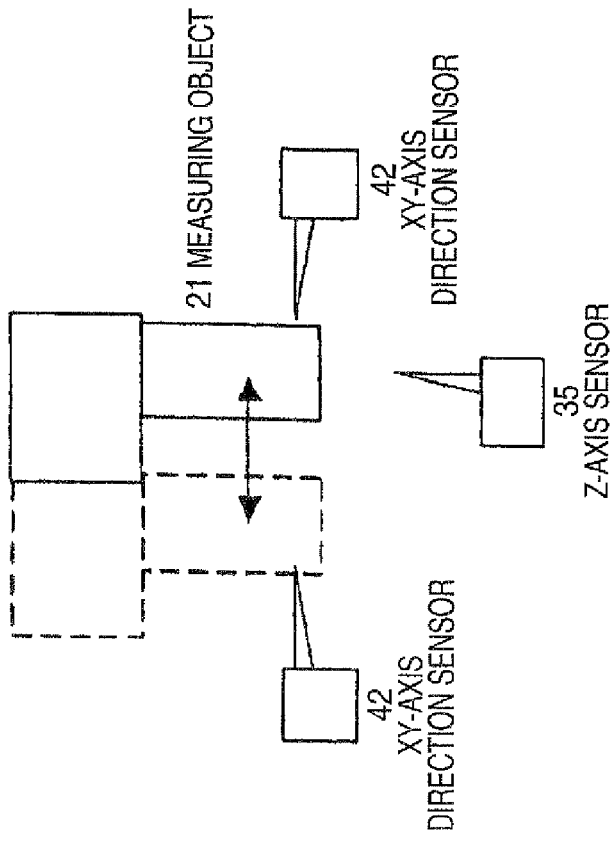
(b) TWO-AXIS SENSOR SYSTEM WITH CONCURRENT USE OF C-AXIS FIG. 10
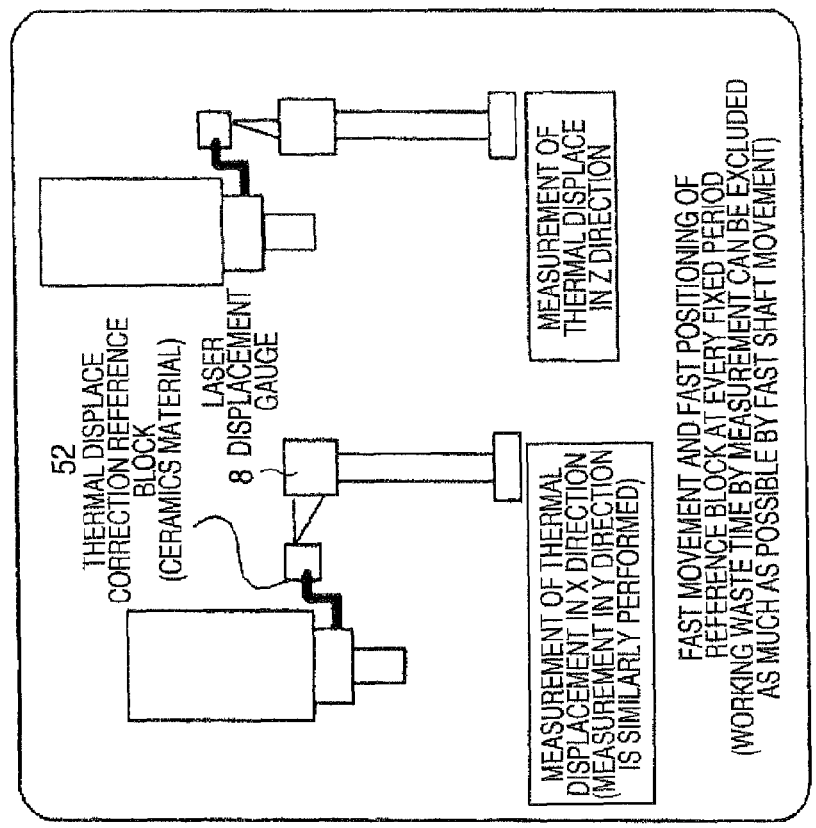
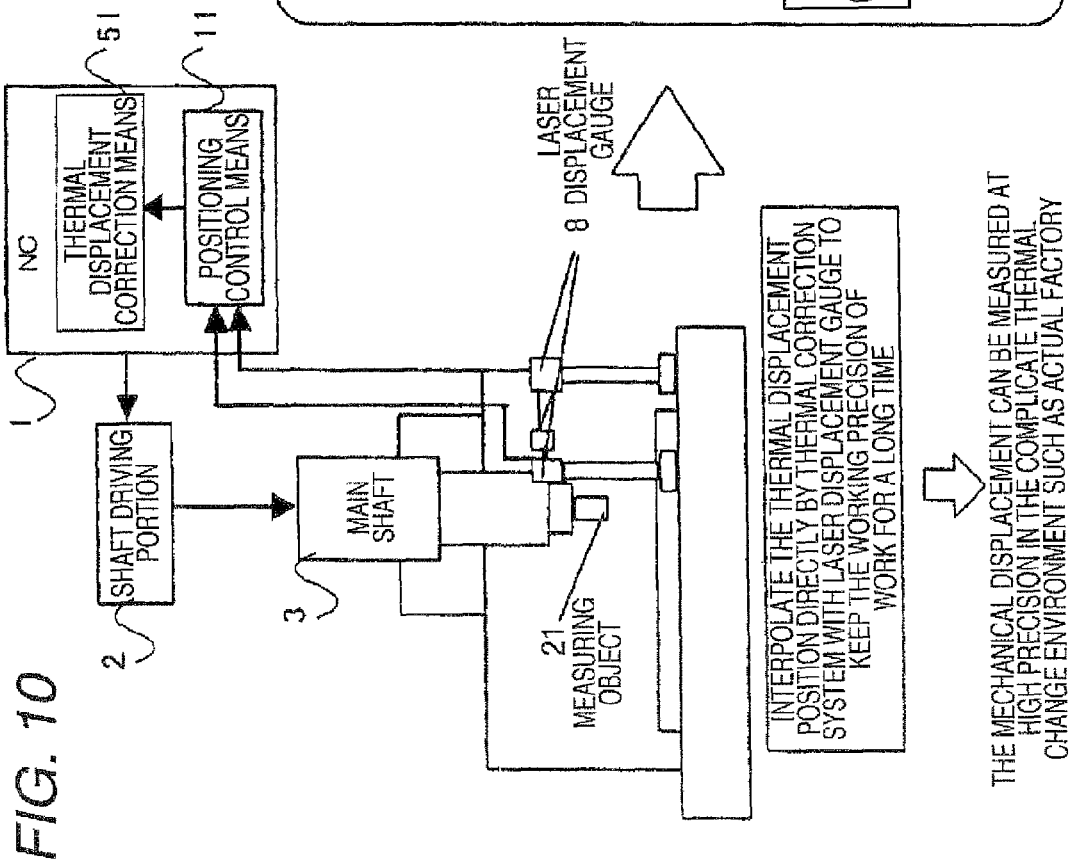

POSITIONING DEVICE AND POSITIONING METHOD WITH NON-CONTACT MEASUREMENT

TECHNICAL FIELD

The present invention relates to a positioning device, and more particularly to instrumentation of a non-contact measurement with high precision.

BACKGROUND ART

The conventional positioning device for electric discharge machining or cutting work achieves the high precision positioning by an electrical contact sensing method between a work piece and an electrode or tool, using the conductivity of the work piece or tool electrode (e.g., refer to patent document 1).

Also, a method for measuring the residual cutting amount of material accurately and safely, using a long distance measurement laser displacement sensor, without making direct contact with the material and with a sufficient distance between the material and the tool left, was established (e.g., refer to patent document 2).

Moreover, there was established a positioning method for positioning a table by driving a drive mechanism, based on the detection result of the rough feed amount in a first position detection sensor and the detection result of the minute feed amount in a second position detection sensor, in which the first position detection sensor detects the rough feed amount of the table on which the work piece is laid and the second position detection sensor detects the minute feed amount (e.g., refer to patent document 3).

Patent document 1: JP-A-2003-205439 (FIG. 2)
Patent document 2: JP-A-2000-52198
Patent document 3: JP-A-63-109956

DISCLOSURE OF THE INVENTION

Problems that the Invention is to Solve

The conventional positioning device using proximate contact sensing means had a problem that the measuring time was longer because the approach speed must be decreased to suppress a physical damage between the measuring object and the object to be measured and suppress the impact at the time of contact.

Also, a contact sensing probe was required to have the increased rigidity to suppress deformation due to a pressure at the time of contact, and accordingly a spherical portion of the probe tip was required to have a predetermined fixed size or a size that is greater than this predetermined fixed size.

Therefore, there was a drawback that the measurement of a minute shape portion was impossible because the spherical portion at the probe tip could not be made closer to the minute shape portion.

In such a case, since a special measuring instrument having a pin gauge was employed, it was required that the measurement object was once taken out and measured off-line. Also, for a minute shape into which the pin gauge could not enter, it was required to employ optical means for the measurement, whereby the measurement object was once taken out, and the measurement section was enlarged and the shape was measured off-line using a microscope with a CCD camera or the like.

Even though the measurement object once taken out was additionally worked again from the measurement results, it was difficult to install it again at the original position accurately, whereby it was impossible to perform the accurate additional work based on the measurement results.

Also, when the measured object has a minute pin shape, for example, the minute pin shape is so minute that the measured object is deformed due to a contact pressure by probe contact, whereby the measurement itself becomes impossible.

In this case, it was required that the measurement section was enlarged and the shape was measured off-line using the microscope with the CCD camera, as described above.

On the other hand, when a long distance measurement laser displacement sensor is employed, a very minute object can be measured owing to the non-contact measurement. However, since the typical long distance measurement laser has a resolution of 10 µm and an error of about 0.2 mm, it is difficult to employ the long distance measurement laser displacement sensor as high precision positioning means. The long distance measurement laser displacement sensor is limited to the use in the field of simple shape determination on the assembly line or the like, for example, and is difficult to apply for the positioning control for electric discharge machining, for example, for which the high precision operation (resolution of about 0.1 µm) is required.

Also, when a high precision laser length measuring machine is chosen, the error can be suppressed below about 5 µm, but the length measurable range of the high precision laser length measuring machine is restricted to about 10 mm±1 mm, and the high precision laser measuring machine and the measuring object must be laid in a range of about 10 mm±1 mm, whereby its practical direct use is difficult.

Also, in a working machine that is controlled in a unit of drive with a resolution of 0.1 µm, it is difficult to measure a high precision work that is processed in a unit of submicron, and substitute for the conventional contact positioning.

This invention has been achieved to solve the above-mentioned problems, and it is an object of the invention to provide a positioning device capable of performing the precise positioning operation at high speed without need of apprehending a collision at the time of measurement and without need of preparing a positioning program based on a plurality of shape data for each measurement shape.

Means for Solving the Problems

According to the present invention, there is provided a positioning device characterized by comprising moving means for relatively moving a positioning object and length measuring means for measuring the distance to the positioning object in non-contact manner and outputting a detection signal if the positioning object is detected only in a length measuring area within a predetermined range from any detection position, shaft control means for stopping the moving means by detecting the detection signal from the length measuring means and automatically correcting for an overshoot amount between the stop position and any detection position, when the moving means relatively moves the positioning object and the length measuring means, and positioning control means for storing the coordinate value after the automatic correction by the shaft control means and performing the positioning based on the reference coordinate value.

Advantages of the Invention

With this invention, the positioning device comprises non-contact length measuring means, means for stopping the measurement object approaching at high speed at the stage of entering any length measuring distance, based on positional data from the length measuring means, means for automatically correcting for the overshoot amount with the positional data, and controlling the shaft to any position, and means for reading the Numerical Controller (NC) coordinate value of the main shaft after the automatic correction, whereby there is the effect that it is unnecessary to apprehend a collision at the time of measurement, and the precise positioning operation can be performed at high speed.

BRIEF DESCRIPTION OF THE DRAWINGS

FIG. 8 is a view showing a positioning system at the time of concurrent use of a C axis according to an embodiment 3 of the invention.

FIG. 10 is a constitutional view of a positioning device according to an embodiment 4 of the invention.

DESCRIPTION OF REFERENCE NUMERALS AND SIGNS

Figure 1:
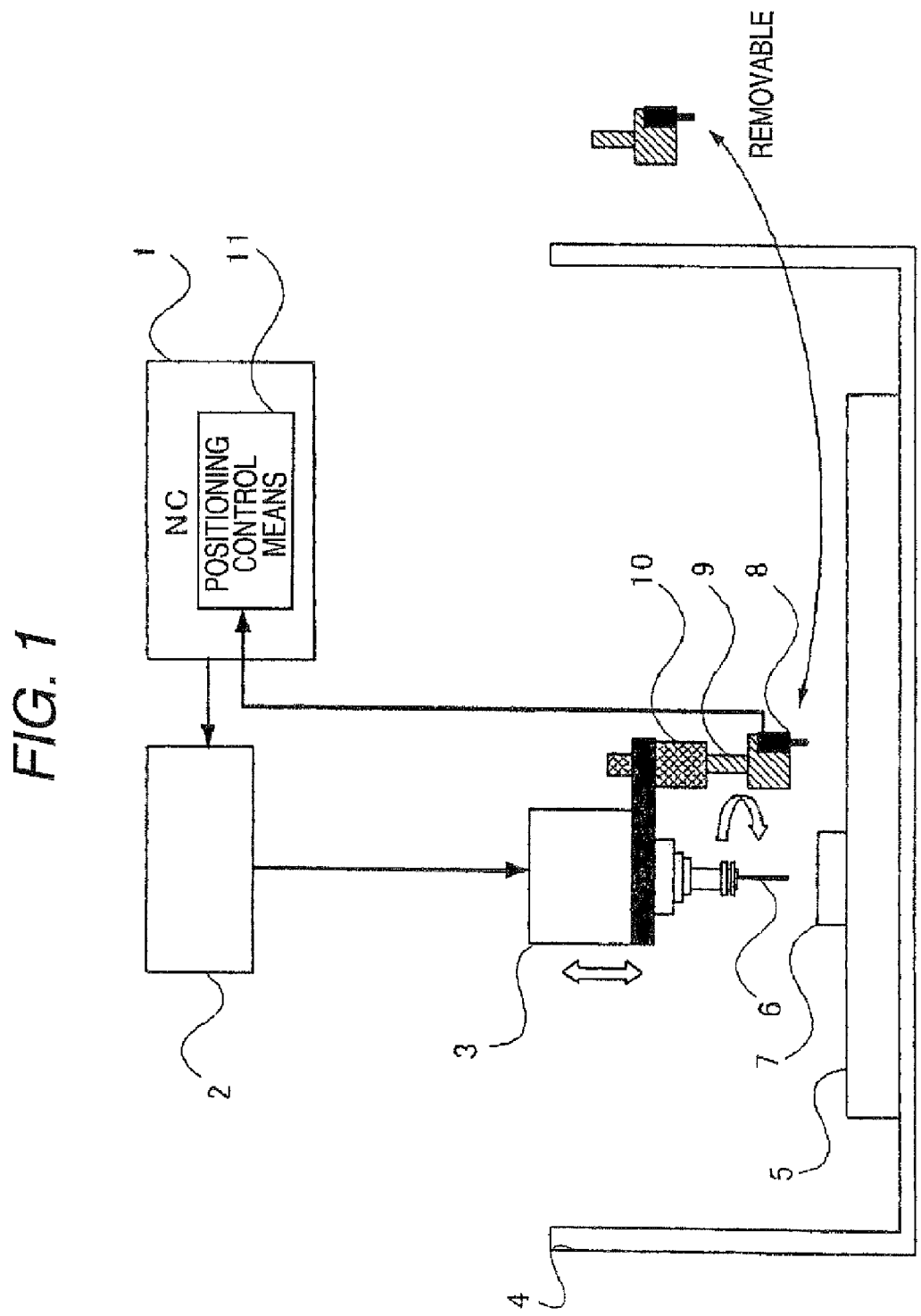
FIG. 1 is a constitutional view of a positioning device according to an embodiment 1 of the present invention.

1 shaft control device
2 shaft driving portion
3 main shaft head portion
4 processing vessel
5 surface plate
6 tool electrode
7 work piece
8 non-contact sensor
9 removable sensor unit
10 sensor mounting guide
11 positioning control means
21 measuring object
31 +X-axis sensor
32 −X-axis sensor
33 +Y-axis sensor
34 −Y-axis sensor
35 Z-axis sensor
36 reference block
41 C-axis
42 XY-axes direction sensor
51 thermal displacement correcting means
52 thermal displacement correcting reference block

BEST MODE FOR CARRYING OUT THE INVENTION

Embodiment 1

FIG. 1 shows the constitution of a positioning device according to an embodiment 1 of the present invention, which is applied to an electric discharge machine.

In FIG. 1, the electric discharge machine comprises shaft control means 1 such as NC, shaft driving means 2, a main shaft head portion 3, a processing vessel 4 and a surface plate 5. Usually, a tool electrode 6 is installed on the main shaft head portion and a work piece 7 is placed on the surface plate.

In the invention, a non-contact sensor 8 represented by a laser displacement gauge is mounted on a removable sensor unit 9, which is mounted on the main shaft portion through a sensor mounting guide 10.

Herein, an output signal from the non-contact sensor 8 is sent to the shaft control means 1 and an optimal shaft feed command is issued to the shaft driving means 2 by the positioning control means 11.

Figure 2:
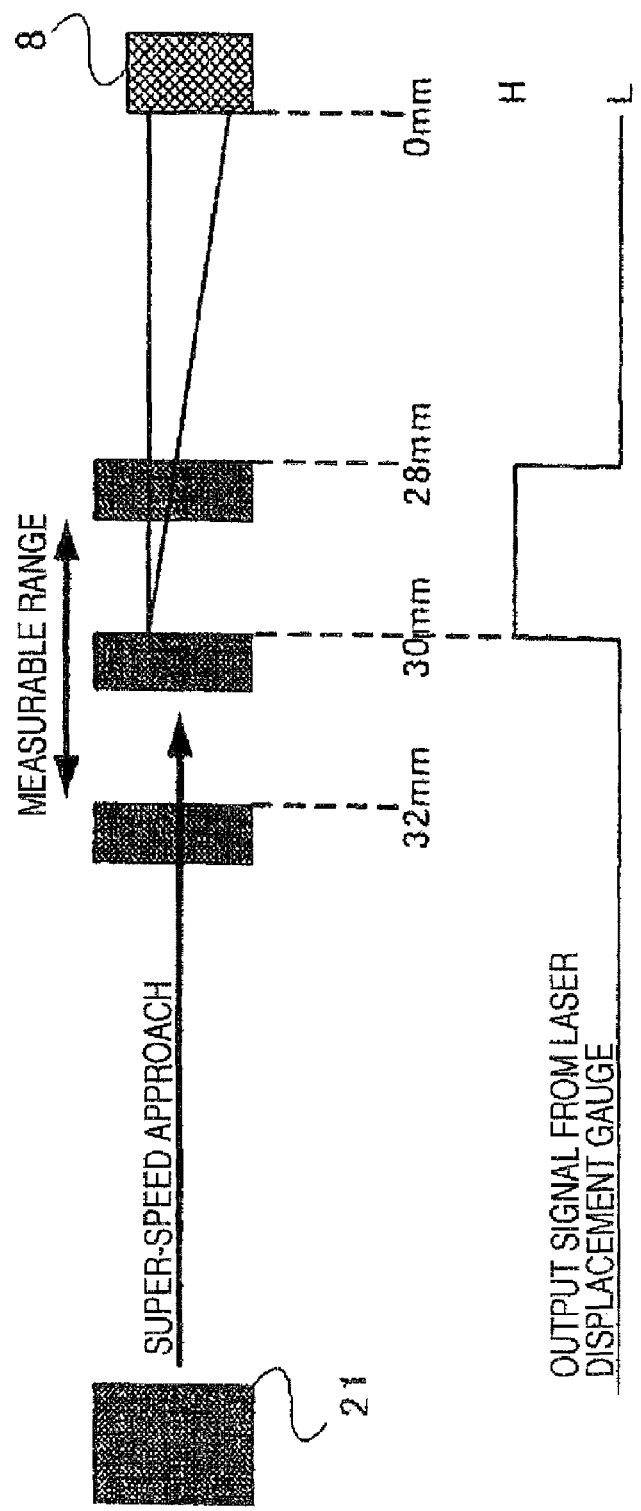
FIG. 2 is a view showing a sensor output signal of the positioning device.
Figure 3:
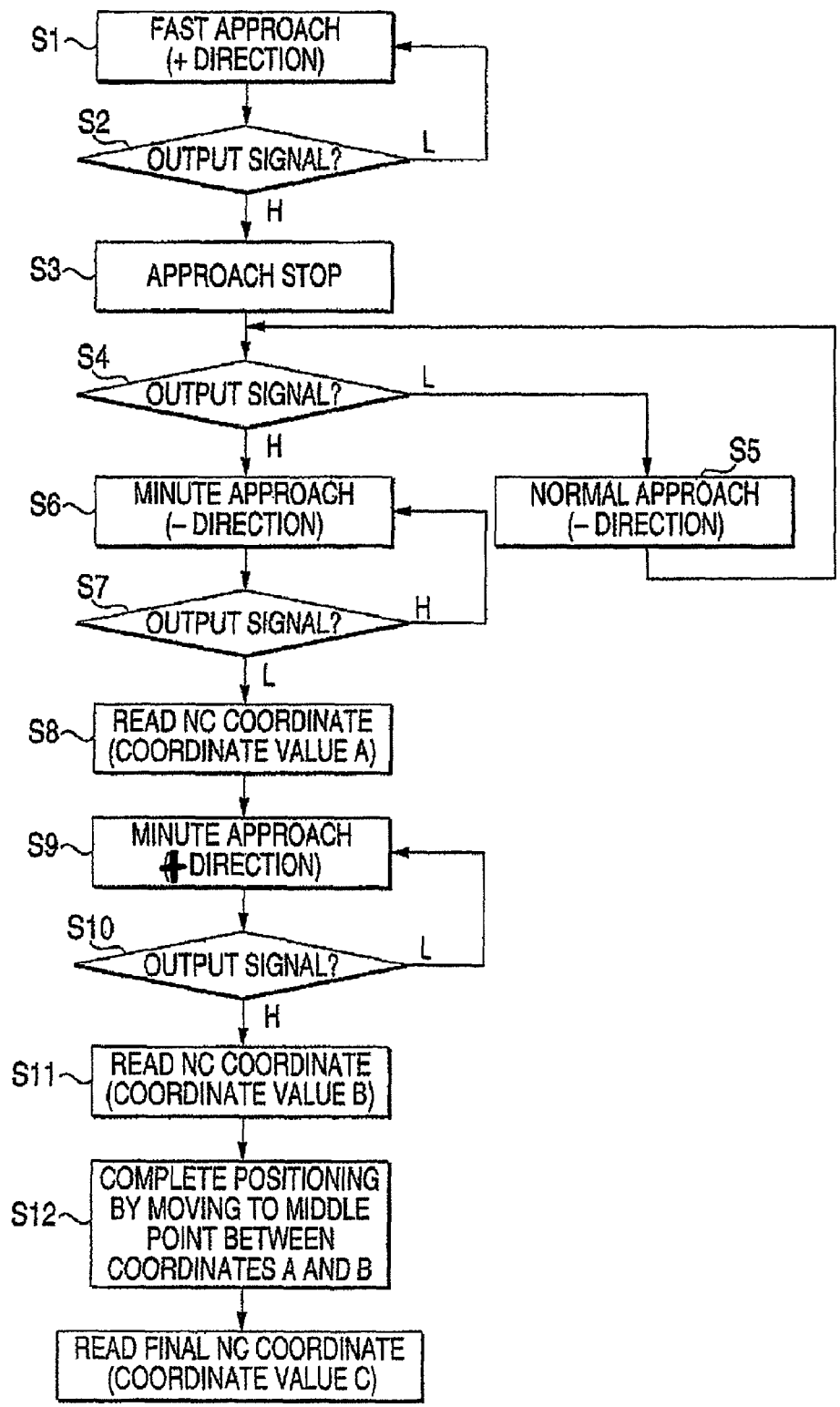
FIG. 3 is a system flowchart of the positioning device.

FIG. 2 shows an output signal from the non-contact sensor 8, and FIG. 3 shows a system flow in which the drive means 2 performs the optimal measurement operation based on the output signal under the control of the positioning control means 11. The high precision non-contact sensor as described in this embodiment has a limited length measurement range, which is generally as large as about 30 mm±2 mm for the resolution of 0.5 μm and about 5 mm±0.3 mm for the resolution of 0.1 μm.

The output signal from the non-contact sensor 8 is switched between H and L at any position in the length measurement range (typically an intermediate position in the length measurement range) in accordance with the output specification.

In this output specification, means for generating the signal at any position is illustrated, but another method may be alternatively employed.

By controlling the shaft driving portion 2 in accordance with the system flowchart as shown in FIG. 3, the non-contact sensor 8 and a measured portion of the work piece 7 can be moved in a fixed distance and the coordinate value of the drive shaft at that time can be read by the shaft control means 1.

Referring to FIG. 2, first of all, an operation for changing the output signal between H and L at any position in the length measurement range will be described below.

When a positioning command is executed, the shaft driving portion 2 drives the main shaft head portion 3, based on a command from the shaft control means 1, so that the non-contact sensor 8 mounted on the removable sensor unit 9 performs the relative movement (approaching motion) to a measured portion (measurement object 21) of the work piece 7. The non-contact sensor 8 has the length measurement range as described above. If the measurement object 21 is detected at any position (e.g., an intermediate position of the length measurement range), the output signal switches from L to H, in which the output signal is maintained at the H level within the length measurement range and becomes the L level out of the length measurement range.

Figure 4:
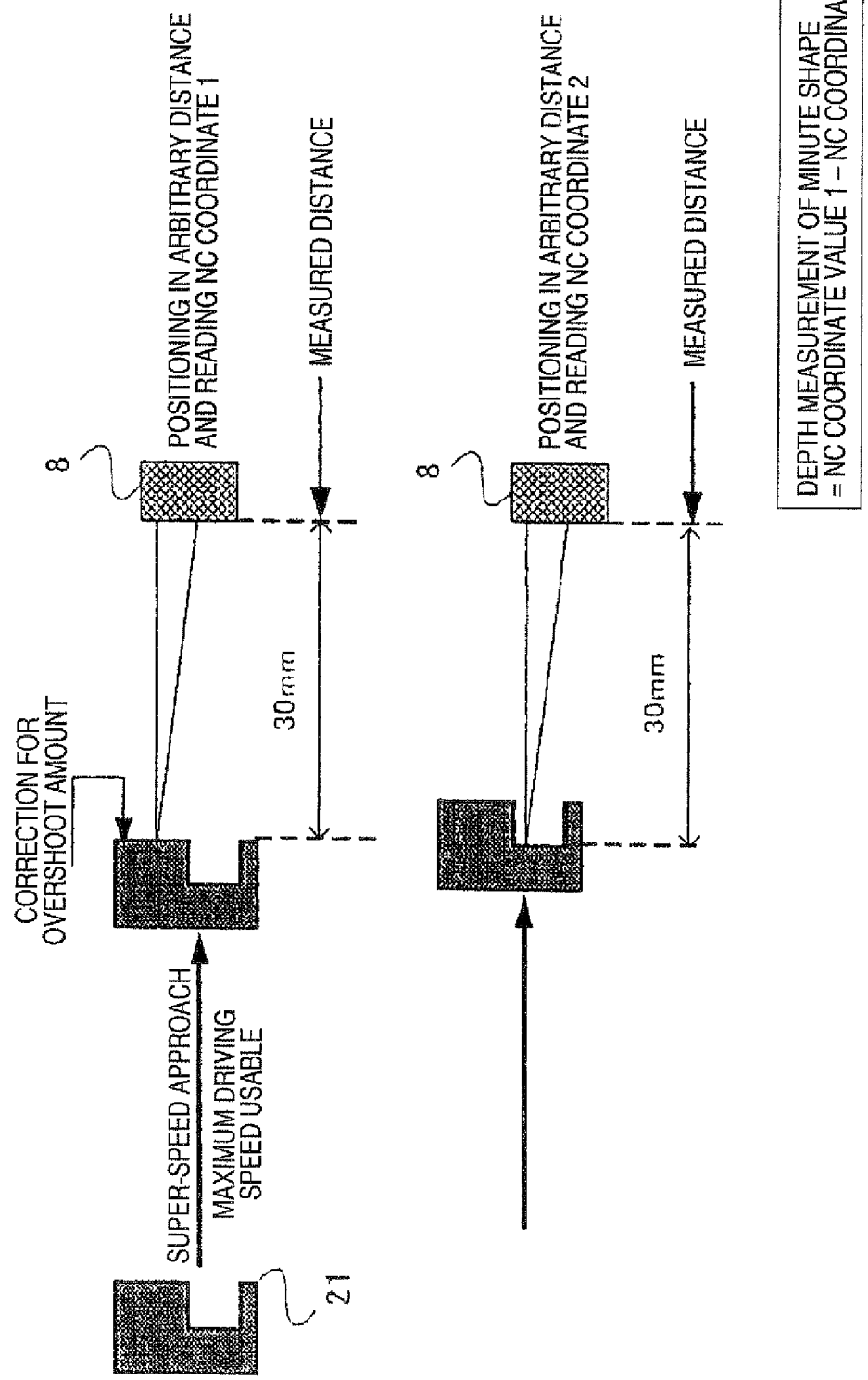
FIG. 4 is a view showing the high-speed and high precision depth measurement for a minute part in the positioning device.

The positioning operation of this embodiment makes effective use of detection in this length measurement range. A positioning process as shown in FIG. 3 will be described below using an operation concept view as shown in FIG. 4.

S1) When the positioning command is executed, the fast shaft movement is performed in the direction toward the object of measurement (+ direction in this case) so that the sensor head portion is moved to the measurement object.

The fast shaft movement can be set at the maximum speed (e.g., 50 m/min in the case of linear driving) that is settable in the NC control device 1.

S2) If the output signal is L signal (with the coordinates a head of any given coordinates) by referring to the output signal from the non-contact sensor 8 at every fixed period (e.g., in a range from about 1 KHz to about 10 Hz) during the movement, the movement is continued.

S3) If the output signal from the non-contact sensor 8 is H signal (constant distance from any given coordinates to the object of measurement), the shaft movement is stopped.

The distance after issuing an approach stop command by detecting the H signal from the non-contact sensor 8 until the shaft movement is actually stopped is an overshoot distance (first position).

S4) The sequence of movement control (shaft direction and shaft movement speed) is changed according to the influence degree of overshoot along with the movement by referring to the output signal again after the shaft movement is stopped.

S5) If the output signal from the sensor is L in stopping the shaft at S3), the overshoot amount is large (2 mm or greater (=distance between the sensor and the measurement subject 21 being within 28 mm) in the case of FIG. 2), whereby the shaft return operation is performed to any given coordinate value (in one direction in this case) at a normal speed slower than the fast shaft movement speed (speed for use in the conventional positioning).

By referring to the output signal from the non-contact sensor 8 at every fixed period (e.g., in a range from about 1 KHz to about 10 Kz) during the shaft return operation based on S5), when the output signal turns from L to H (=distance between the sensor and the measurement object 21 being about 28 mm), the shaft movement is stopped.

S6) On the other hand, if the output signal is H in stopping the shaft at S3), or the overshoot amount is recognized as small (within 2 mm in the case of FIG. 2) owing to the operation based on S5), the overshoot amount is corrected at a minute feed speed (e.g., in a range from about 30 mm/min to about 1 mm/min) slower than the fast shaft movement speed.

S7) The shaft movement is stopped (second position) when the output signal is L (=distance between the sensor and the measurement object 21 being 30 mm) by referring to the output signal at every fixed period during the shaft return to any given coordinate value based on S6).

S8) The positioning control means 11 such as NC reads the coordinate value (coordinate A) of the drive shaft at the position of S7).

This coordinate value (coordinate A) is the coordinate value moved in one direction by the overshoot amount when the shaft is moved in one direction by the minimum unit of the fixed period at a minute feed speed from the target position (30 mm) where the shaft is essentially positioned.

S9) After reading the coordinate value (coordinate A), the shaft subsequently makes an approach at the minute feed speed in the opposite direction (+ direction) to that of S6).

S10) The shaft movement is stopped (third position) when the output signal is H by referring to the output signal at every fixed period in approaching in the opposite direction (+direction).

S11) The shaft control means such as NC reads the coordinate value (coordinate B) of the shaft movement at the position of S10).

This coordinate value (coordinate B) is the coordinate value moved in + direction by the overshoot amount when the shaft is moved in + direction by the minimum unit of the fixed period at the minute feed speed from the target position where the shaft is essentially positioned.

S12) The shaft is moved to the middle point between coordinate A and coordinate B by checking the hysteresis value of the output signal due to a difference in the approach direction (a discrepancy of the detection value when the detection value is different depending on the approach direction (+ direction and − direction) in order to remove the influence of hysteresis.

S13) The coordinate is read at the final positioning completion location (coordinate C) to which the shaft is moved.

Since this measuring method has a feature of performing the measurement in non-contact manner, there is the advantage that the measurement precision is not affected, irrespective of whether the overshoot amount is large or small.

Also, there is no damage due to collision unless the overshoot amount exceeds the distance between the measurement object and the target coordinate (approach target), whereby the movement speed can be increased.

If the overshoot amount is too large, the coordinate correction time up to the target coordinate is increased, whereby it is required to appropriately set the movement speed for the shaft return to shorten the measuring time as much as possible.

When the shaft is moved at a maximum of 50 m/min by a linear drive device, the overshoot amount is 8.3 mm, estimating the delay time as 0.01 seconds, whereby there is no fear that the problem such as collision arises with the device of this embodiment.

The high speed and high precision depth measurement for the minute portion as shown in FIG. 4 is allowed by using this system.

The process is as follows.

1) The drive control device such as NC performs the positioning at high speed on the plane becoming the reference of depth measurement (measurement reference point) and reads the drive coordinate (NC coordinate 1) at the same position through the process as shown in FIG. 3.

2) Subsequently, the drive control device such as NC performs the positioning at high speed and reads the drive coordinate (NC coordinate 2) at the same position in the depth measuring portion (depth measuring point) in the same manner as above.

3) The depth of the minute portion can be obtained by the relative coordinate between the coordinate 1 and the coordinate 2.

That is, the depth of the minute portion can be calculated from the depth measurement value=NC coordinate 1−NC coordinate 2.

That is, the non-contact sensor 8 is positioned at the position a fixed distance (30 mm in this embodiment) away from each of the measurement reference point and the depth measurement point, and a difference between both the NC coordinate values is calculated, whereby the precise depth data can be acquired rapidly. It is not required that the operator intervenes in the positioning, whereby the automation can be easily made using the program or the system.

Conventionally, since a specific measuring instrument having a pin gauge was employed, it was required that the measurement object was once taken out and measured off-line, or for a minute shape into which the pin gauge could not enter, it was required that the measurement object was once taken out and the measurement section was enlarged and the shape was measured off-line using a microscope having a CCD camera or the like.

However, the depth measurement can be made directly on the processing machine by using this method.

A merit of the measurement on the machine is that the additional machining for the shape correction can be easily made based on the measurement results, because it is not required to move the measurement object after machining, and the error factors with the movement of the measurement object can be excluded.

Next, the reason why the non-contact sensor 8 is used simply for positioning at any distance but not directly measuring the distance will be described below.

FIG. 5 is data representing the error amount of a typical laser length measuring instrument.

The X-axis (transverse axis) of the graph represents the read value of the drive coordinate for the distance between the laser head and the measurement object by the drive control means such as NC.

On the other hand, the Y-axis (longitudinal axis) represents the difference (error amount) from coordinate data recognized by the laser length measuring machine at that time when the coordinate value is positive.

The measurement range specification of the laser length measuring machine is from 28 mm to 30 mm.

Figure 5A:
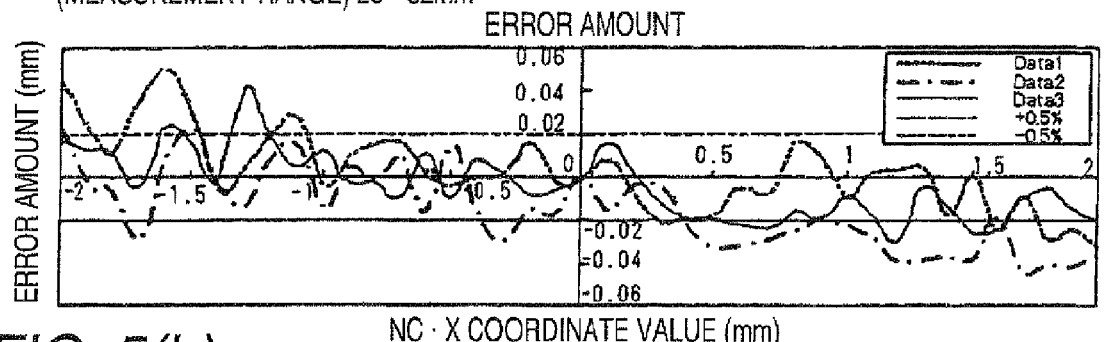
FIG. 5 is a view showing the relationship between the measurement distance and the error amount in a laser displacement gauge.
Figure 5B:
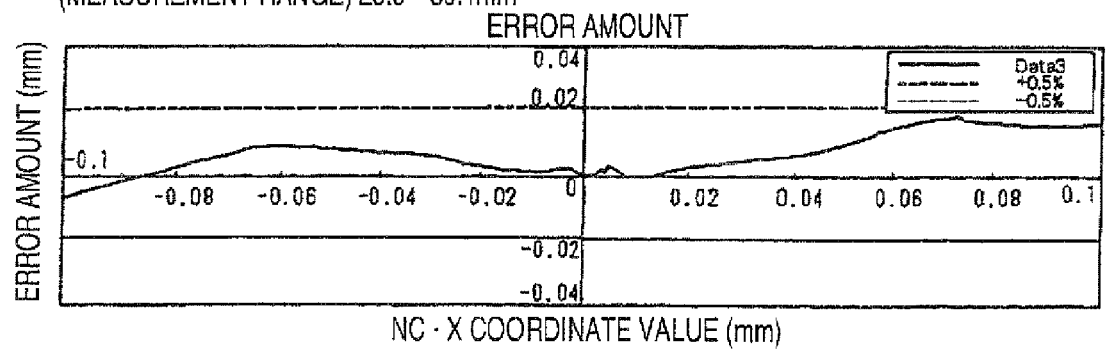
Figure 5C:
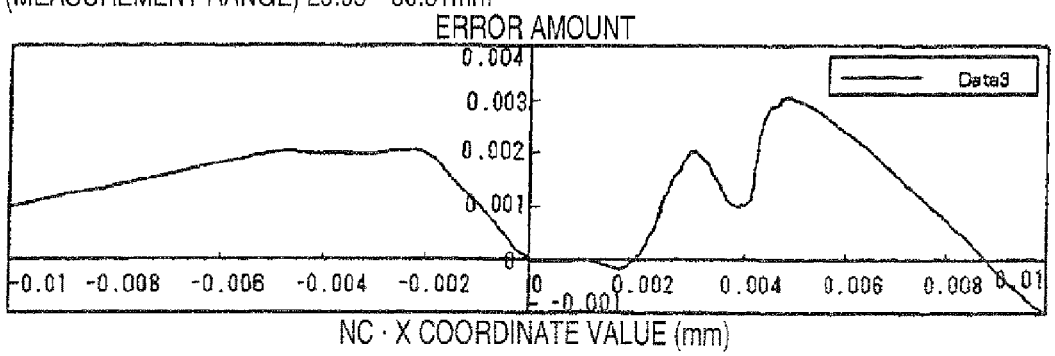

FIG. 5A shows data of 28 mm to 30 mm from the drive coordinate value, FIG. 5B shows data of 29.9 mm to 30.1 mm, and FIG. 5C shows data of 29.99 mm to 30.1 mm.

When the drive coordinate value and data from the laser length measuring machine are the same, the error amount of the Y-axis should be always zero.

However, in the actual data, the error amount increases or decreases according to the measurement distance, indicating a limitation of the H/W precision in the current laser length measurement precision.

The maximum error amount is 51 μm in a full measurement range of ±2 mm.

In FIG. 5A, the repeat accuracy (Data(1) to (3)) is also acquired, and the measurement results of making measurements three times under the same conditions are indicated at the same time.

As a result, there is dispersion in three measurement results.

That is, it is difficult to make the absolute position measurement at high precision in the full range of ±2 mm.

On the other hand, the laser length measuring instrument makes the adjustments so that the measurement error may be minimized at an intermediate location in the measurement range, whereby the repeat accuracy at the same location (30 mm in this case) is suppressed to 1 μm or less (see FIG. 5C).

From the above, the laser length measuring instrument has a very small error in measuring the measurement object any distance away (30 mm in this case).

Therefore, it is possible to make the positioning of the measurement object at the position any distance away at very high precision, using the laser length measuring instrument, whereby the positioning system of this embodiment employs this scheme.

In this case, in the numerical control tool machine with drive means for moving the main shaft and the sensor portion, it is a mandatory requirement for improving the measurement precision to assure a certain static precision.

With this embodiment, the positioning device comprises non-contact length measuring means, means for stopping the measurement object approaching at high speed at the stage of entering any length measuring distance, based on the positional data from the length measuring means, means for automatically correcting for the overshoot amount with the positional data and controlling the shaft to any position, and means for reading the NC coordinate value of the main shaft after the automatic correction, whereby there is the effect that the precise positioning operation can be performed at high speed without apprehending the collision at the time of measurement.

Embodiment 2

Figure 6:
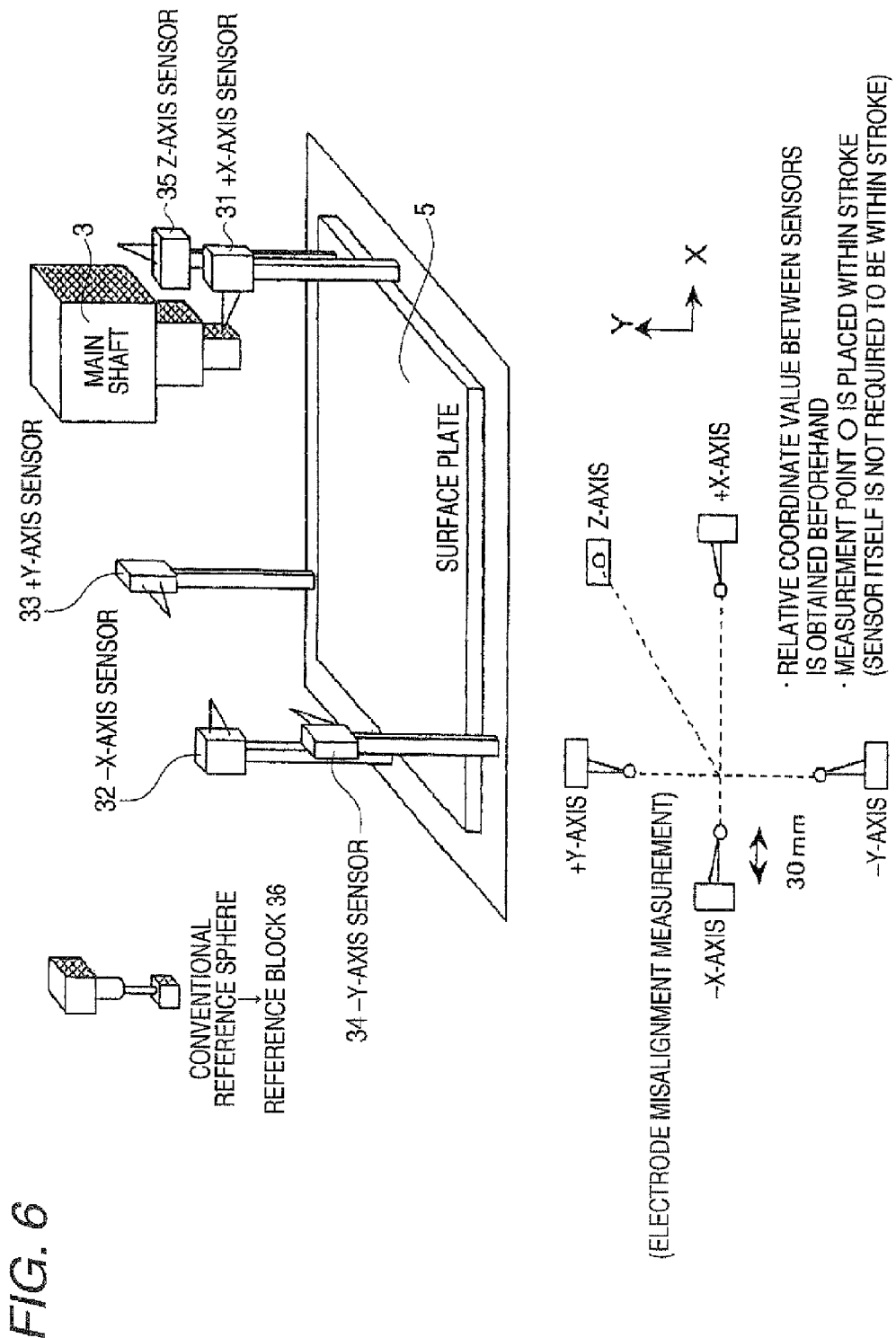
FIG. 6 is a constitutional view of a positioning device according to an embodiment 2 of the invention.

FIG. 6 shows a positioning device according to an embodiment 2.

In the electric discharge machine as shown in the embodiment 1, non-contact length measuring means are further provided, including +X-axis sensor 31, −X-axis sensor 32, +Y-axis sensor 33, −Y-axis sensor 34 and Z-axis sensor 35 in a total of five axis directions.

To implement a positioning process as will be described later, the relative coordinate values between sensors are obtained beforehand.

Figure 7:
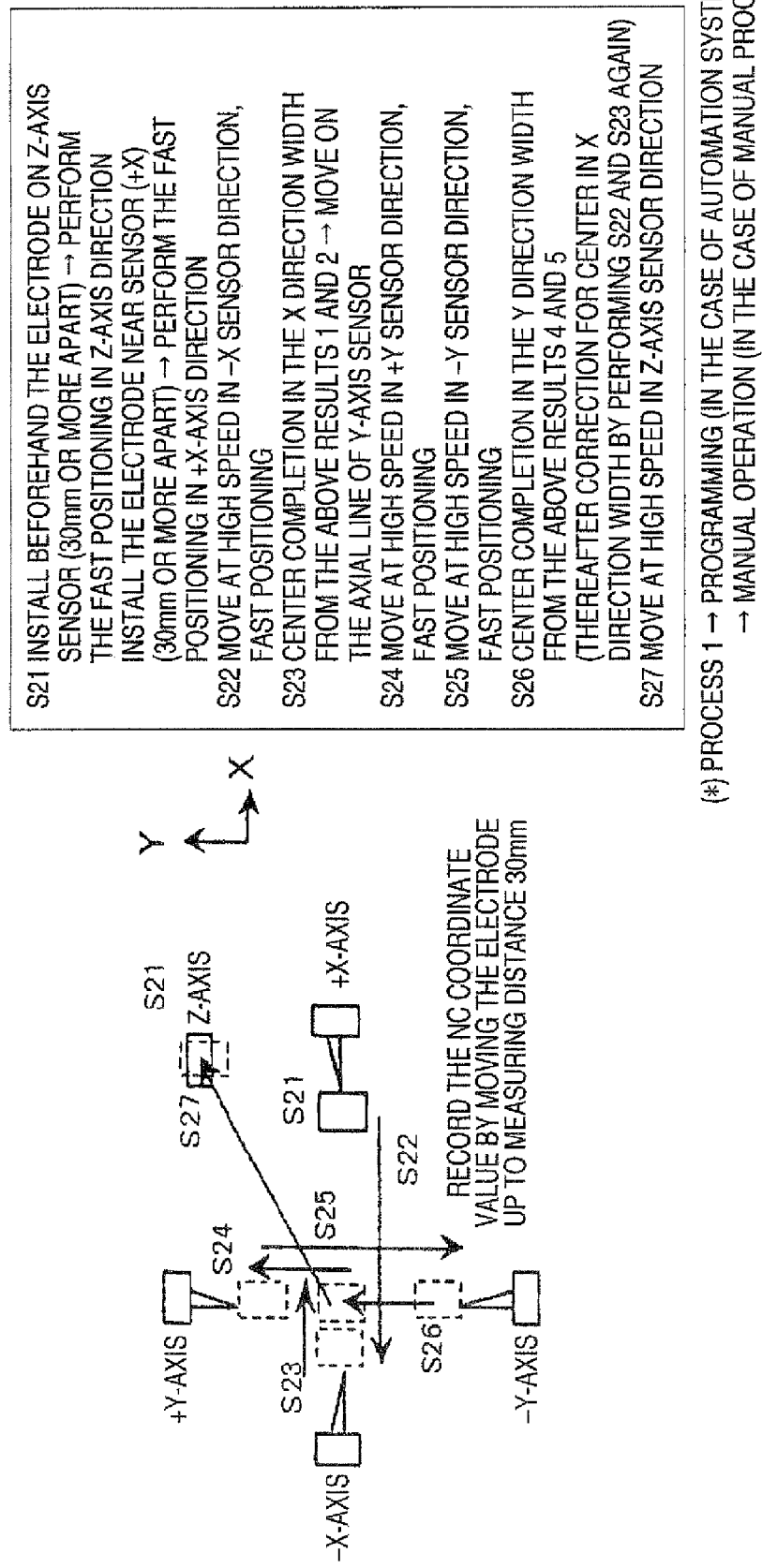
FIG. 7 is a view showing a positioning process of the positioning device.

FIG. 7 shows a positioning process for measuring the misalignment correction amount of the measuring object (tool electrode or the like) with respect to the main shaft.

S21) The electrode is installed beforehand on the Z-axis sensor 35 (separated by 30 mm or more), and if a Z-axis positioning command is executed, the electrode is positioned at high speed in the Z-axis direction toward the Z-axis sensor.

The process to be performed is the same as shown in the embodiment 1, and the details are omitted.

After the completion of positioning, the shaft control means 1 represented by the NC reads the coordinate value for the stop coordinate of the drive system.

This coordinate value indicates the coordinate correctly 30 mm above the Z-axis sensor 35.

Subsequently, the electrode is installed (30 mm or more away) near the +X-axis sensor 31.

As an installation method, the operator manually operates the drive system simply, or the automatic control may be made in accordance with a program based on the electrode shape data acquired beforehand, and the position coordinate value of the +X-axis sensor 31.

After the completion of installing the electrode, a +X-axis direction positioning command is executed.

The electrode is positioned in the +X-axis sensor direction at high speed in the same manner as above, and after the completion, the drive coordinate is read by the NC.

This coordinate value indicates the coordinate correctly −30 mm from the +X-axis sensor 31.

S22) After the completion of positioning at high speed in the +X-axis direction, the fast movement and the fast positioning are performed in the direction of −X-axis sensor 32 and the NC coordinate is read.

This coordinate value indicates the coordinate correctly +30 mm from the −X-axis sensor 32.

S23) The center coordinate in the electrode width between the +X-axis sensor 31 and the −X-axis sensor 32 can be detected in the X direction width from the results of S21 and S22.

That is, the misalignment amount of the electrode in the X-axis direction can be calculated from the coordinate value acquired from the positioning operation at S21 and S22.

For this misalignment amount of the electrode, the positions of the +X-axis sensor and the −X-axis sensor are already known, and therefore the center coordinate A between the positions of the X-axis sensor and the −X-axis sensor is already known, whereby if the electrodes are symmetrical, the center coordinate B between the coordinate value acquired at S21) and the coordinate value acquired at S22) should be matched with the coordinate A. However, if the coordinate A and the coordinate B are unmatched, the electrodes are not symmetrical, producing the misalignment amount of the electrode.

Next, the electrode is moved on the axial line of the Y-axis sensor.

As moving means of the electrode, the operator manually operates the drive system simply, or the automatic control may be made in accordance with the program based on the electrode shape data and the position coordinate value of the +Y-axis sensor 33 acquired beforehand in the same manner as when the electrode is installed on the X-axis sensor.

S24) After the completion of installing the electrode, a positioning command in the +Y-axis direction is executed.

The electrode is positioned at high speed in the +Y-axis sensor direction and after the completion, the drive coordinate is read by the NC in the same manner as above.

This coordinate value indicates the coordinate correctly −30 mm from the +Y-axis sensor 33.

S25) After the completion of positioning at high speed in the +Y-axis direction, the fast movement and the fast positioning are performed in the direction of −Y-axis sensor 34, and the coordinate is read by the NC in the same manner.

This coordinate value indicates the coordinate correctly +30 mm from the −Y-axis sensor 34.

S26) The center coordinate in the electrode width between the +Y-axis sensor 33 and the −Y-axis sensor 34 can be detected in the Y direction width from the results of S24 and S25.

That is, the misalignment amount of the electrode in the Y-axis direction can be calculated from the coordinate value acquired from the positioning operation at S24 and S25.

For this misalignment amount of the electrode, because the positions of the +Y-axis sensor and the −Y-axis sensor are already known, and therefore the center coordinate C between the positions of the +Y-axis sensor and the −Y-axis sensor is already known, if the electrodes are symmetrical, the center coordinate D between the coordinate value acquired at S24 and the coordinate value acquired at S25 should be matched with the coordinate C. However, if the coordinate C and the coordinate D are unmatched, the electrodes are not symmetrical, producing the misalignment amount of the electrode.

After the completion of S25 and S26, the steps S22 and S23 may be performed again, as needed, whereby the misalignment amount in the X direction is measured again to minimize the error amount.

S27) After settling the misalignment amount in the XY direction, the shaft is moved at high speed in the Z-axis sensor direction, and returned to the first positioning start coordinate, whereby the positioning operation is ended.

The above one series of operation can be automated by the program.

With the embodiment 2, since there are provided the non-contact length measuring means in a total of five axis directions, including ±X-axis directions, ±Y-axis directions and Z-axis direction, the approach speed for positioning can be greatly higher than the conventional contact positioning.

Though it was required that the high precision correction for misalignment of the tool electrode with respect to the main shaft was suppressed to about 30 mm/min or less in the conventional contact positioning, the fast positioning operation at a speed of 1000 mm/min or greater is allowed in this embodiment.

Also, the faster operation can be performed by using the linear drive system.

Embodiment 3

Though the non-contact sensors in a total of five axis directions are required to correct for misalignment in the embodiment 2, the correction for misalignment can be made in the same manner by the non-contact sensors with a total of two axes including one axis on the XY plane and one axis in the Z-axis direction by the concurrent use of the C-axis (rotation axis) on the main shaft.

FIG. 8 shows a positioning system when the C-axis is used concurrently.

Instead of making the measurement from four directions on the XY plane, the measurement object can be measured from four directions (±X, ±Y) by using only the sensor in one axis direction owing to the rotation around the C-axis.

Figure 9:
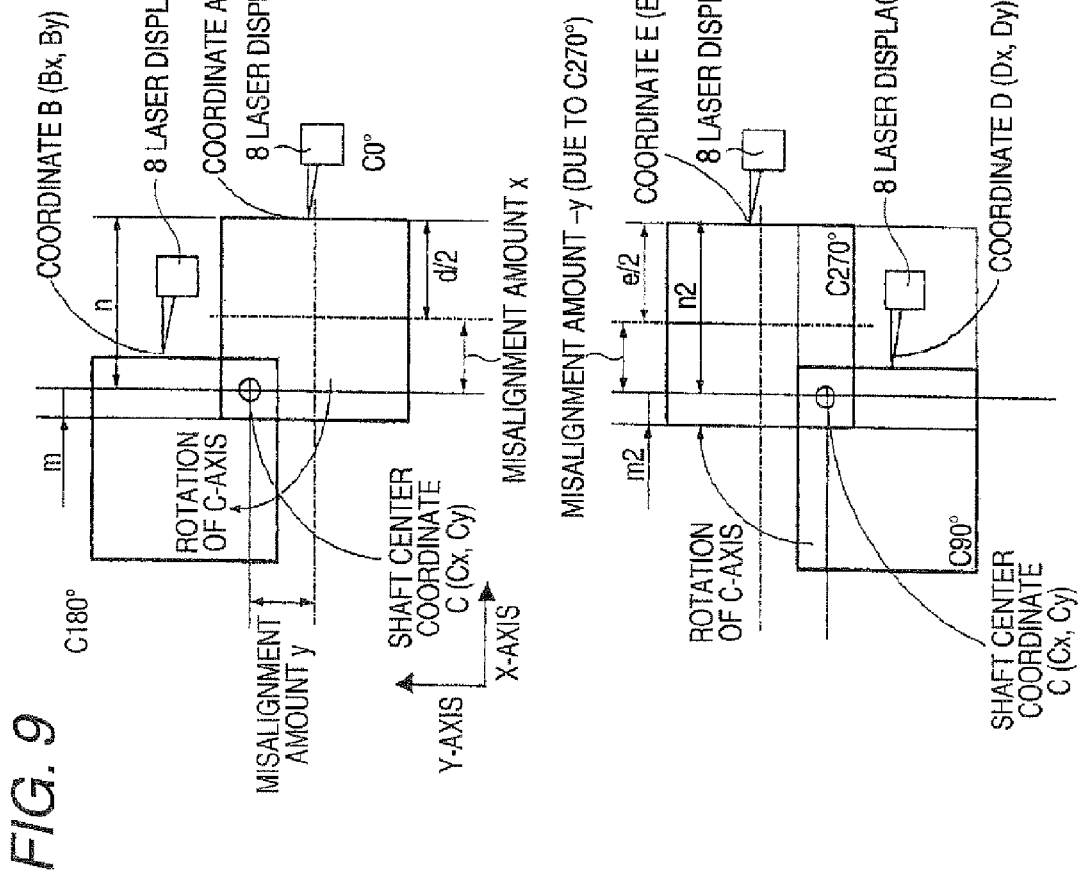
FIG. 9 is a view showing a misalignment correction value calculation method at the time of concurrent use of the C axis in the positioning device.

From the measurement results, to calculate the actual misalignment correction amount, the measurement object is rotated in four directions of C0°, C90°, C180° and C270°, and the following process is performed, as shown in FIG. 9.

S31) The laser length measuring instrument and the measurement object are controlled in any distance at the position C0°, whereby the coordinate value A at this time is acquired (the positioning process is clearly specified in the embodiment 1).

S32) The coordinate value B is acquired by making the same control at the position of C180°.

S33) The misalignment amount x is calculated from the expression 1 (see the following for the calculation expression).

S34) The coordinate value D is acquired by making the same control at the position of C90°.

S35) The coordinate value E is acquired by making the same control at the position of C270°.

S36) The misalignment amount y is calculated from the expression 2 (see the following for the calculation expression)

Measurement at C0° and C180°:

$$m = Bx - Cx$$

$$n = Ax - Cx$$

(Cx is the Known Value.)

$d/2 = (m+n)/2$ (d is the width of electrode in the X-axis direction.)

$$\begin{aligned} &= Ax/2 + Bx/2 - Cx \\ x &= Ax - d/2 \\ &= Ax/2 - Bx/2 + Cx \end{aligned} \qquad \text{Expression 1}$$

Measurement at C90° and C270°:

$$m2 = Dx - Cx$$

$$n2 = Ex - Cx$$

(Cx is the known value.)

$$\begin{aligned} e/2 &= (m2 + n2)/2 \\ &= Dx/2 + Ex/2 - Cx \\ -y &= Ex - e/2 \\ &= Ex/2 - Dx/2 + Cx \\ y &= -Ex/2 + Dx/2 - Cx \end{aligned} \qquad \text{Expression 2}$$

Misalignment calculated value (x,y)

$$x = Ax/2 - Bx/2 + Cx$$

$$y = -Ex/2 + Dx/2 - Cx$$

Also, with this method, the rotation of the C-axis is used in measuring the misalignment of the electrode, presupposing that there is no misalignment in the C-axis itself.

In the C-axis drive portion of the main shaft, if the misalignment amount exists for the rotation, it is required to measure in advance the C-axis misalignment amount at 90°, 180° and 270° with respect to 0°. For example, assuming that the misalignment amounts in the X direction at 90°, 180° and 270° are X90, X180 and X270, the above calculation expression is represented as follows.

$$x = Ax/2 - (Bx - X180)/2 + Cx. \qquad \text{Expression 1'}$$

$$y = -(Ex - X270)/2 + (Dx - X90)/2 - Cx. \qquad \text{Expression 2'}$$

That is, the above calculation expression is corrected by acquiring in advance this data, whereby the high precision positioning can be implemented.

With this embodiment 3, the non-contact length measuring means in each axis direction can be shared by comprising the C-axis drive portion of the main shaft, whereby it is possible to implement the high precision correction for misalignment of the tool electrode with respect to the main shaft at high speed.

Embodiment 4

FIG. 10 shows an application example of a positioning device according to an embodiment 4, which is applied to an electric discharge machine.

The electric discharge machine comprises shaft control means 1, shaft driving means 2 and the main shaft head portion 3.

In this embodiment, the non-contact sensor 8 represented by a laser displacement gauge capable of making the measurement in the X, Y, and Z axis directions as shown in the embodiments 1 and 2 is mounted as shown in FIG. 6. Also, a thermal displacement correction reference block 52 is directly attached on the main shaft 3, whereby a mechanical thermal displacement amount can be measured with the reference block 52 as a representative point.

The non-contact sensor 8 measures the reference block 52, and if its position measurement result is different as time progresses, its value can be considered as the mechanical thermal displacement amount.

An output signal from the non-contact sensor 8 is sent to the shaft control means 1, whereby the positioning control means 11 makes an optimal shaft feed command to the shaft driving means 2 to correct for the mechanical thermal displacement amount.

The fast positioning of the thermal displacement correction reference block 52 made of ceramics material and attached on the main shaft 3 is performed at every fixed periodic interval (e.g., the acquisition interval being arbitrarily settable from one second to one minute) as in the embodiment 1, whereby the positioning control means 11 acquires the NC coordinate value after positioning.

Since the displacement of the NC coordinate value occurs in accordance with a change in the temperature under the environment where the machine tool is installed, and indicates the mechanical thermal displacement amount of the structure, which is mainly casting, the mechanical thermal displacement amount is acquired at every fixed period.

The thermal displacement correction means 51 can control the acquired mechanical thermal displacement amount by adding the correction value to the intrinsic positional command on the S/W control for every NC command of the drive control device so that the driving operation may cancel the mechanical thermal displacement amount.

Figure 11:
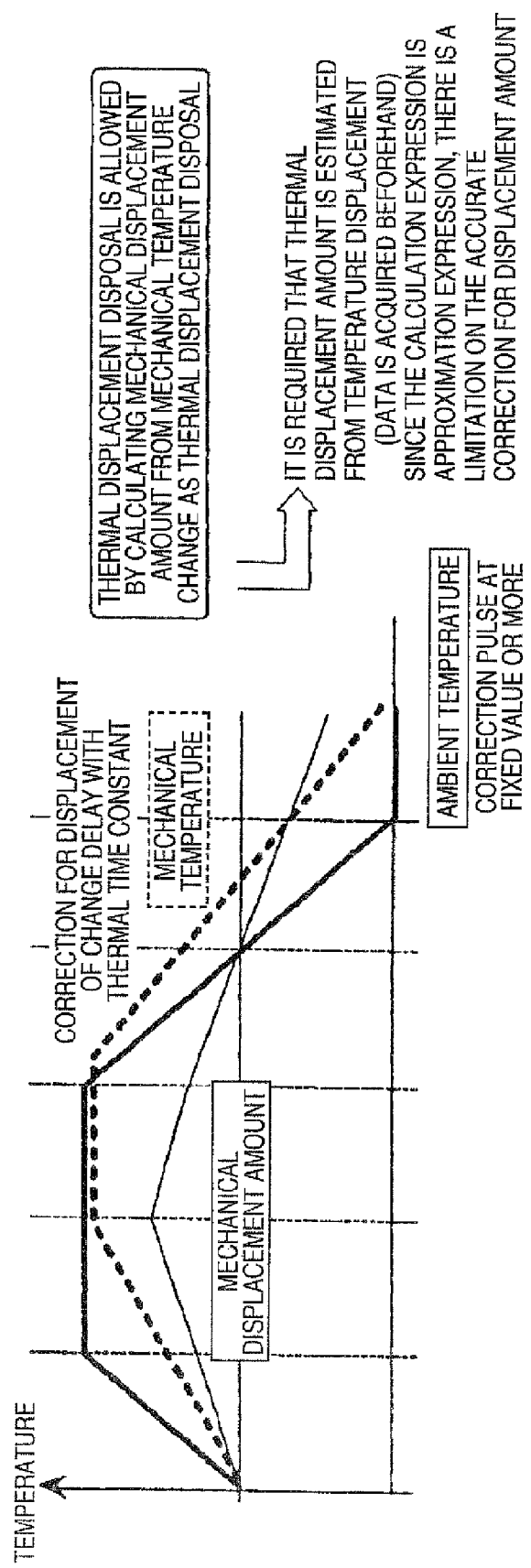
FIG. 11 is a view showing the relationship between the machine temperature and the machine displacement amount for a machine tool.

FIG. 11 shows the relationship of the mechanical thermal displacement amount relative to the mechanical temperature change.

The mechanical thermal displacement amount can be calculated from the mechanical temperature change as shown in FIG. 11 by configuring an approximate expression, but there is a limitation on the correction for the mechanical thermal displacement amount because of an approximate solution insistently.

In the case of the correction with the approximate expression, the correction for the mechanical thermal displacement amount is limited to about ½. For example, when the mechanical thermal displacement amount at the tip of the electrode is 20 µm, an error amount caused by the thermal displacement of about 10 µm still remains even if the correction is made.

On the other hand, in this embodiment wherein the displacement amount is directly corrected, the error amount can be made zero in principle immediately after the measurement, whereby it is beneficial that the mechanical thermal displacement amount is directly measured as in this embodiment to accurately correct for the mechanical thermal displacement amount to make the high precision working.

In the case where the measurement is directly made as in this embodiment, the working is interrupted and there is a waste time due to the measurement of the thermal displacement correction reference block 52, but if the non-contact measurement method as in the above embodiments is employed, the shaft movement speed can be increased up to a mechanical tolerance limit, whereby the waste time can be suppressed.

With this embodiment 4, since the high precision positioning means employing the non-contact measurement method and the thermal displacement correction means from acquisition data are provided, the mechanical displacement can be measured and corrected at high precision in the complicate thermally changing environment such as in the actual factory, whereby the high precision working can be implemented.

INDUSTRIAL APPLICABILITY

The positioning device according to this invention is suitably used as positioning means in various types of numerical control machine tools.

The invention claimed is:

1. A positioning device comprising:
moving means for relatively moving a positioning object;
length measuring means for measuring a distance from a constant coordinate to the positioning object in a non-contact manner and for outputting a detection signal indicating a detection position of the positioning object in which the positioning object is detected only if the positioning object is positioned in a length measuring area within a predetermined range from any detection position;
shaft control means for stopping the moving means by detecting the detection signal from the length measuring means and automatically correcting for an overshoot amount between a stop position of the positioning object via the moving means and said detection position of the positioning object, when the moving means relatively moves the positioning object and the length measuring means; and
positioning control means for storing a coordinate value after the automatic correction by the shaft control means and performing the positioning of the positioning object based on the stored coordinate value, wherein the overshoot amount is a distance from the detection position of the positioning object after issuing an approach stop command by detecting the detection signal from the length measuring means to the stop position of the positioning object in which the movement means is stopped, and wherein overshoot amount correction for the positioning control means is made by performing a low speed movement from a first position to the detection position of the length measuring means and acquiring a second coordinate value of a second position where the movement stops by detecting that the positioning object is out of the length measuring area, and moving the positioning object in a reverse direction at a predetermined speed higher than the low speed to enter the length measuring area, and moving the positioning object to the second position at the low speed from the length measuring area if a stop position at the first position is out of the length measuring area.

2. The positioning device according to claim 1, wherein the overshoot amount correction for the positioning control means is further made by acquiring a third coordinate value of a third position where the movement stops when the positioning object gets to the detection position in the length measuring area, and deciding intermediate coordinates between the second coordinate value and the third coordinate value as the stored coordinate value.

3. The positioning device according to claim 1, wherein the positioning object is fixed on a surface plate, the length measuring means is attached on a main shaft opposite to the surface plate and movable in X, Y, and Z directions, and the positioning is performed by acquiring a coordinate value at each position along with the movement of the main shaft.

4. The positioning device according to claim 1, wherein the length measuring means is fixed at a total of five axes where the five axes are an ±X-axis direction, a ±Y-axis direction and a Z-axis direction on a surface plate, the positioning object is attached on a main shaft opposite to the surface plate and movable in the X, Y, and Z directions, and the positioning is performed by acquiring a coordinate value at each position along with the movement of the main shaft.

5. The positioning device according to claim 1, wherein the length measuring means is fixed at a total of two axes where the two axes are XY-axis direction and Z-axis direction on the surface plate, the positioning object is attached on a main shaft opposite to a surface plate and movable in a X, Y, and Z directions, the main shaft having a rotation drive portion capable of controlling rotation at any angle, and the positioning is performed by acquiring a coordinate value at each position along with the movement of the main shaft.

6. The positioning device according to claim 5, wherein the rotation drive portion of a main shaft is rotated by 90°, 180° and 270° in a positioning operation.

7. A positioning device comprising:
moving means for relatively moving a positioning object;
length measuring means for measuring a distance from a constant coordinate to the positioning object in a non-contact manner and for outputting a detection signal indicating a detection position of the positioning object in which the positioning object is detected only if the positioning object is positioned in a length measuring area within a predetermined range from any detection position;
shaft control means for stopping the moving means by detecting the detection signal from the length measuring means and automatically correcting for an overshoot amount between a stop position of the positioning object via the moving means and said detection position of the positioning object, when the moving means relatively moves the positioning object and the length measuring means; and
positioning control means for storing a coordinate value after the automatic correction by the shaft control means and performing the positioning of the positioning object based on the stored coordinate value,
wherein the overshoot amount is a distance from the detection position of the positioning object after issuing an approach stop command by detecting the detection signal from the length measuring means to the stop position of the positioning object in which the movement means is stopped, and
wherein a numerical controller coordinate value of a main shaft from the positioning control means is read at every fixed time unit, and a correction factor with a mechanical thermal displacement as a prime cause is added using a variation amount of acquired data in moving the main shaft.

8. A positioning method comprising:
measuring a distance from a constant coordinate to a positioning object in a non-contact manner using length measuring means and outputting a detection signal indicating a detection position of the positioning object in which the positioning object is detected only in a length measuring area within a predetermined range from any detection position;
stopping relative movement of the length measuring means and the positioning object by detecting the detection signal in a stop position;
correcting for an overshoot amount measured from the detection position of the positioning object to the stop position of the positioning object; and
positioning the positioning object based on a corrected reference coordinate value obtained based on said correcting,
wherein the overshoot amount correcting comprises:
performing a low speed movement from a first position to the detection position of the length measuring means and acquiring a second coordinate value of a second position where the movement stops by detecting that the positioning object is out of the length measuring area, and
moving the positioning object in a reverse direction at a predetermined speed higher than the low speed to enter the length measuring area, and moving the positioning object to the second position at the low speed from the length measuring area if a stop position at the first position is out of the length measuring area.

9. The positioning method according to claim 8, wherein the overshoot amount correcting comprises:
performing the low speed movement again from the second position to the detection position of the length measuring means and acquiring a third coordinate value of a third position where the movement stops when the positioning object gets to the detection position in the length measuring area, and
deciding intermediate coordinates between the second coordinate value and the third coordinate value as the reference coordinate value.

10. A positioning device comprising:
a sensor which measures a distance from the sensor to a positioning object in a non-contact manner and which outputs a detection signal at a detection position of the positing object where the detection signal indicates that the positioning object is detected when the positioning object is in a measuring range;

a driver which moves at least one of a positioning object and the sensor;

a shaft controller which stops the movement of the at least one of the positioning object and the sensor in a stop position if the detection signal from the sensor is detected and which automatically corrects an overshoot amount between the stop position of the positioning object and the detection position of the positioning object in which the detection signal is output;

a storage unit which stores a coordinate value after the automatic correction by the shaft controller; and a controller which performs positioning based on the stored coordinate value, wherein the shaft controller corrects the overshoot amount by performing a low speed movement from a first position to the detection position of the length measuring means and acquiring a second coordinate value of a second position where the movement stops by detecting that the positioning object is out of the length measuring area, and by moving the positioning object in a reverse direction at a predetermined speed higher than the low speed to enter the length measuring area, and moving the positioning object to the second position at the low speed from the length measuring area if a stop position at the first position is out of the length measuring area.

11. The positioning device of claim 10, wherein the measuring range is a distance in which the sensor can detect presence of the positioning object and wherein the sensor outputs a low signal when the sensor is outside the measuring range and outputs a high signal when the sensor is in the measuring range.

12. The positioning device of claim 11, wherein if the shaft controller stops the movement of the at least one of the positioning object and the sensor outside the measuring range, the driver moves the at least one of the positioning object and the sensor in opposite direction on high speed until the sensor again outputs the detection signal and wherein if the shaft controller stops the movement of the at least one of the positioning object and the sensor in the measuring range, the driver moves the at least one of the positioning object and the sensor in opposite direction in low speed.

13. The positioning device of claim 11, wherein a depth of a minute shape portion of the positioning object is obtained based on the measurements from the sensor.

14. The positioning device of claim 11, wherein a cut or length of the positioning object is obtained based on the measurements from the sensor.

* * * * *